US010990664B2

(12) United States Patent
Uehling et al.

(10) Patent No.: US 10,990,664 B2
(45) Date of Patent: Apr. 27, 2021

(54) ELIMINATING AND REPORTING KERNEL INSTRUCTION ALTERATION

(71) Applicant: International Business Machines Corporation, Armonk, NY (US)

(72) Inventors: Jeffrey M. Uehling, Saint Charles, MO (US); Michael J. Brinker, Rochester, MN (US); Daniel M. Hursh, Saint Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/818,272

(22) Filed: Nov. 20, 2017

(65) Prior Publication Data

US 2019/0156021 A1 May 23, 2019

(51) Int. Cl.
| | | |
|---|---|---|
| *G06F 12/00* | (2006.01) | |
| *G06F 21/51* | (2013.01) | |
| *G06F 12/14* | (2006.01) | |
| *G06F 21/12* | (2013.01) | |
| *G06F 21/56* | (2013.01) | |
| *G06F 21/57* | (2013.01) | |
| *G06F 13/00* | (2006.01) | |
| *G06F 13/28* | (2006.01) | |

(52) U.S. Cl.
CPC .......... *G06F 21/51* (2013.01); *G06F 12/1491* (2013.01); *G06F 21/126* (2013.01); *G06F 21/563* (2013.01); *G06F 21/57* (2013.01); *G06F 2221/031* (2013.01); *G06F 2221/034* (2013.01)

(58) Field of Classification Search
CPC .... G06F 21/51; G06F 12/1491; G06F 21/126; G06F 21/563; G06F 21/57; G06F 2221/031; G06F 2221/034
See application file for complete search history.

(56) References Cited

U.S. PATENT DOCUMENTS

| | | | |
|---|---|---|---|
| 8,225,105 B2 | 7/2012 | Brinker et al. | |
| 9,621,515 B2 | 4/2017 | Diehl et al. | |
| 2004/0015712 A1* | 1/2004 | Szor | G06F 21/566 726/24 |
| 2004/0064457 A1 | 4/2004 | Zimmer et al. | |

(Continued)

OTHER PUBLICATIONS

C. Kruegel, W. Robertson, and G. Vigna, "Detecting kernel-level rootkits through binary analysis," In Computer Security Applications Conference, 2004. 20th Annual (pp. 91-100). IEEE. Retrieved from internet using: http://security.poly.ro/acsac2004.pdf.

(Continued)

*Primary Examiner* — Mark A Giardino, Jr.
(74) *Attorney, Agent, or Firm* — Patterson + Sheridan, LLP

(57) ABSTRACT

Systems, methods, and computer program products to perform an operation comprising monitoring a privileged storage of a computing system, wherein at least a portion of the privileged storage stores a microcode of the computing system, determining, based on the monitoring, that a first location of the privileged storage includes an instruction, determining that the first location is designated as an unused location of the privileged storage, and performing a predefined operation to remove the instruction from the first location of the privileged storage.

20 Claims, 5 Drawing Sheets

(56) References Cited

U.S. PATENT DOCUMENTS

| | | | |
|---|---|---|---|
| 2004/0153820 A1* | 8/2004 | Goethals | G06F 11/22 714/37 |
| 2005/0204205 A1* | 9/2005 | Ring | G06F 21/57 714/47.1 |
| 2005/0229250 A1* | 10/2005 | Ring | G06F 21/57 726/23 |
| 2006/0112241 A1* | 5/2006 | Weiss | G06F 12/1425 711/154 |
| 2007/0079178 A1* | 4/2007 | Gassoway | G06F 21/566 714/38.14 |
| 2008/0092235 A1 | 4/2008 | Comlekoglu | |
| 2008/0141024 A1 | 6/2008 | Ranganathan | |
| 2009/0271844 A1* | 10/2009 | Zhang | G06F 12/1458 726/2 |
| 2015/0089654 A1* | 3/2015 | Yu | G06F 21/568 726/23 |
| 2015/0134909 A1* | 5/2015 | Yochai | G06F 3/0611 711/118 |
| 2017/0300688 A1* | 10/2017 | Spisak | G06F 11/302 |

OTHER PUBLICATIONS

L. Litty, and D. Lie, "Manitou: a layer-below approach to fighting malware," In Proceedings of the 1st workshop on Architectural and system support for improving software dependability (pp. 6-11). ACM. Retrieved from internet using: http://sites.google.com/site/lionellitty/research/publications/ASID06.pdf.

A. Seshadri, M. Luk, N. Qu, and A. Perrig, "SecVisor: A tiny hypervisor to provide lifetime kernel code integrity for commodity OSes," In ACM SIGOPS Operating Systems Review (vol. 41, No. 6, pp. 335-350). ACM. Retrieved from internet using: http://www.cs.cmu.edu/~arvinds/pubs/secvisor.pdf.

* cited by examiner

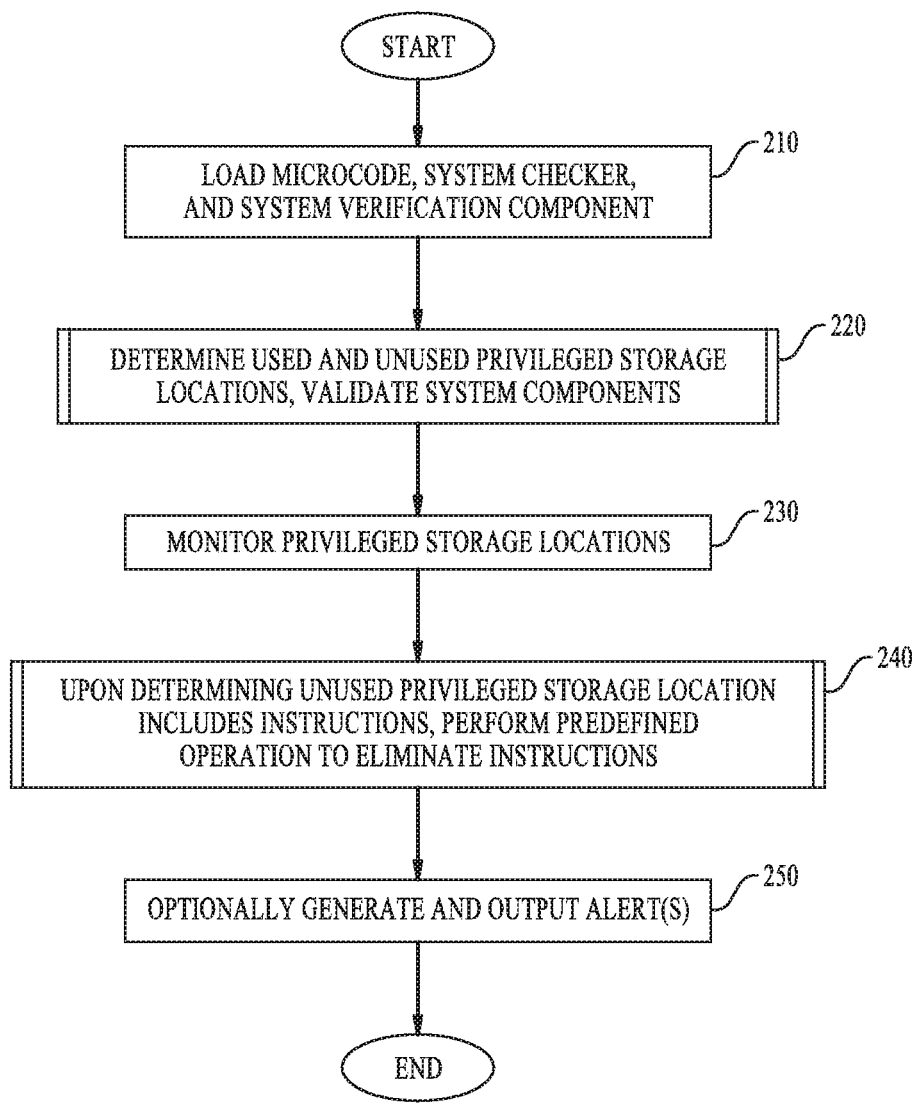

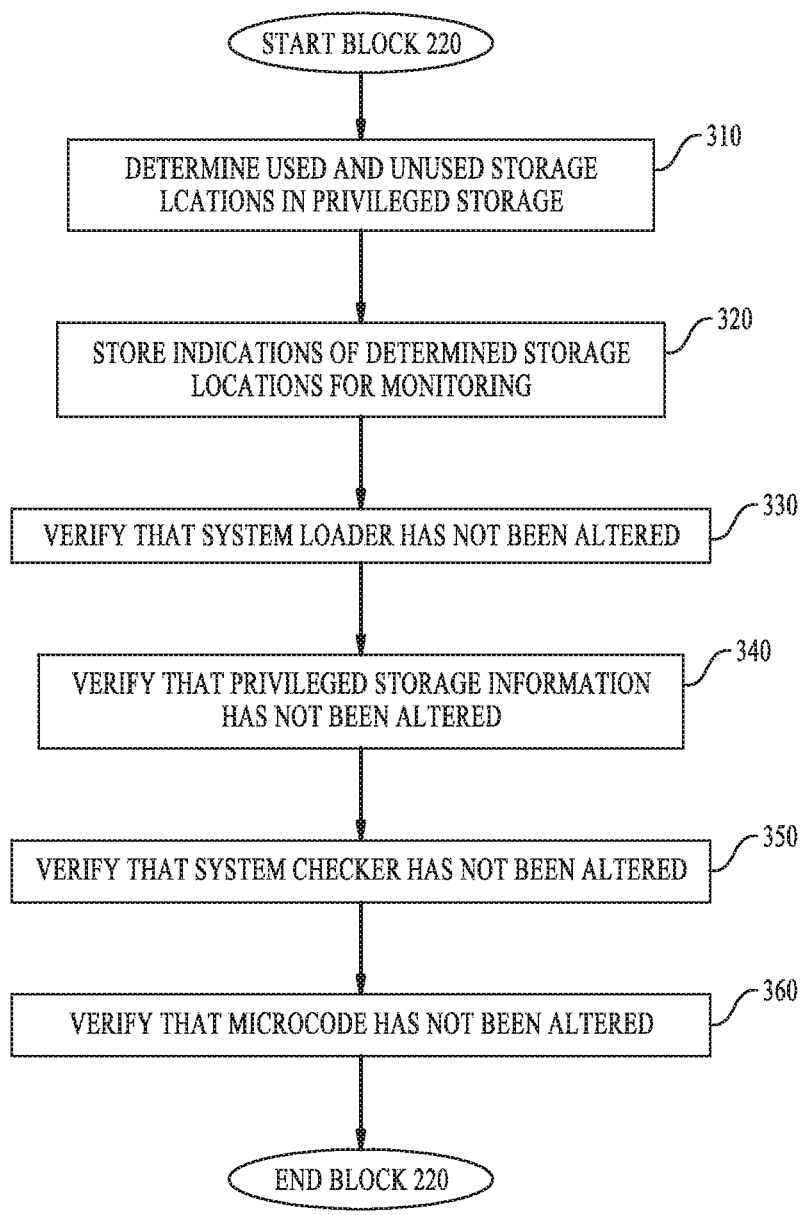

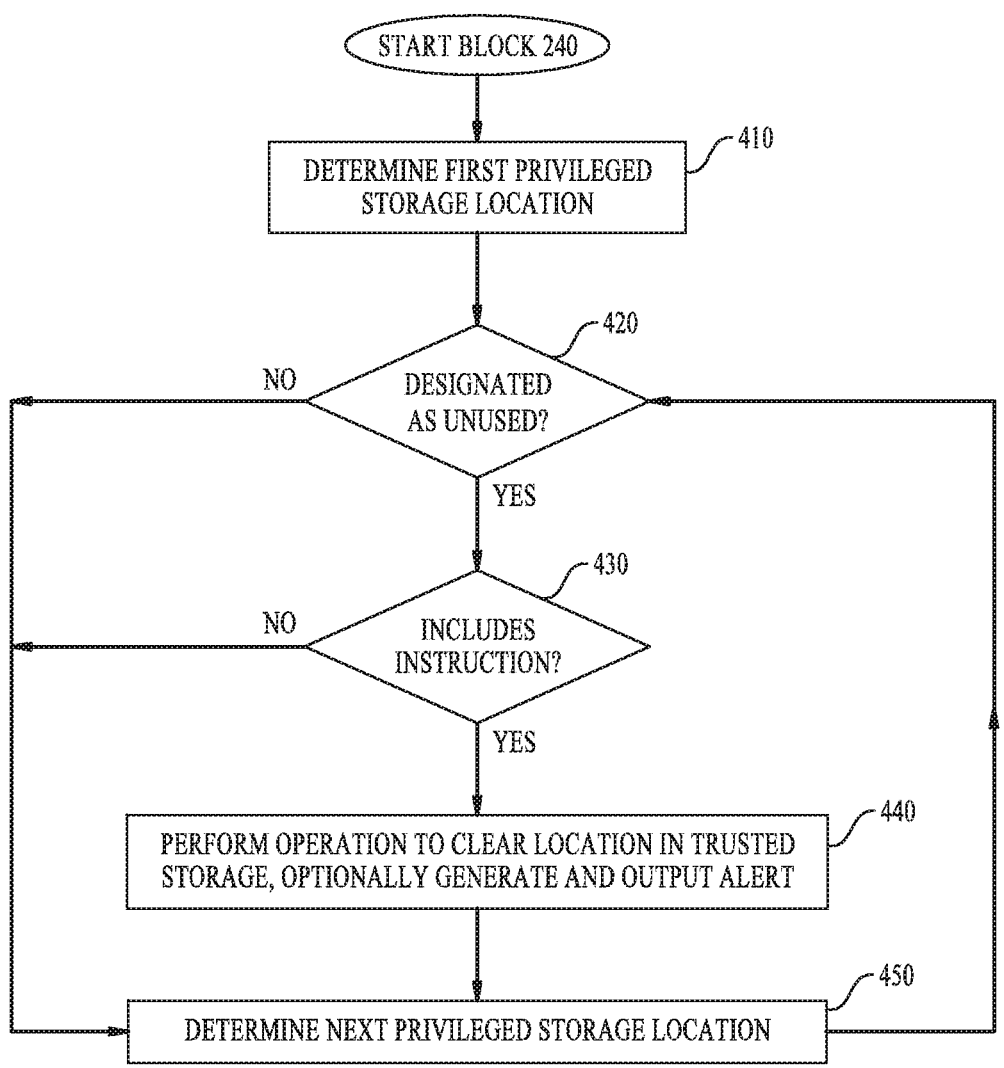

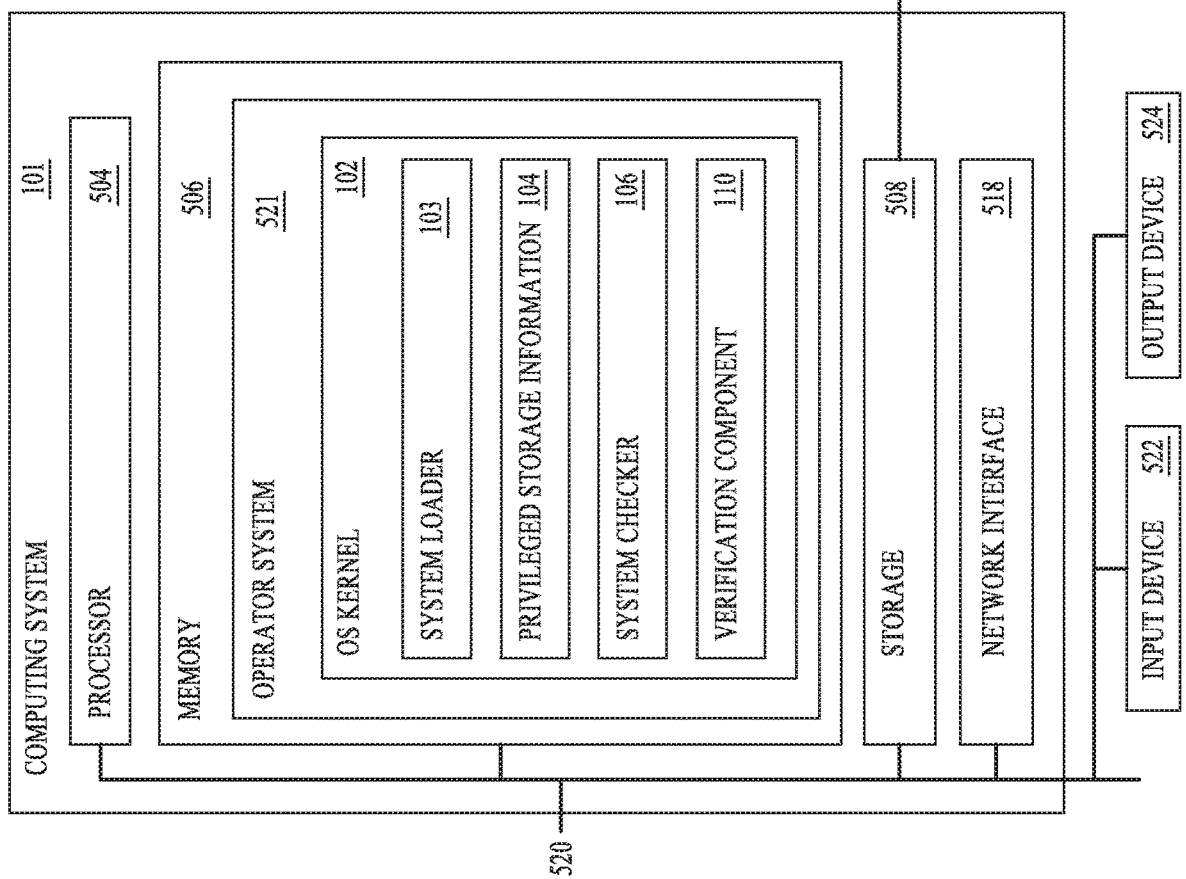

ELIMINATING AND REPORTING KERNEL INSTRUCTION ALTERATION

BACKGROUND

The present invention relates to computing systems, and more specifically, to eliminating and reporting kernel instruction alteration in computing systems.

Conventionally, a user with sufficient authority (or privileges) can use a service tool to modify memory and/or storage locations on a computing system. The memory and/or storage locations being modified in such a manner may include privileged locations that are used to store kernel-level privileged instructions. As such, malicious kernel code may be inserted into the privileged locations. When executed at runtime, the malicious code asserts a privileged state, and gains unfettered access to the system, posing substantial security risks to the system.

SUMMARY

According to one embodiment, a method comprises monitoring a privileged storage of a computing system, wherein at least a portion of the privileged storage stores a microcode of the computing system, determining, based on the monitoring, that a first location of the privileged storage includes an instruction, determining that the first location is designated as an unused location of the privileged storage, and performing a predefined operation to remove the instruction from the first location of the privileged storage.

In another embodiment, a system comprises a processor and a memory storing instructions, which when executed by the processor, performs an operation comprising monitoring a privileged storage of a computing system, wherein at least a portion of the privileged storage stores a microcode of the computing system, determining, based on the monitoring, that a first location of the privileged storage includes an instruction, determining that the first location is designated as an unused location of the privileged storage, and performing a predefined operation to remove the instruction from the first location of the privileged storage.

In another embodiment, a computer-readable storage medium has computer-readable program code embodied therewith, the computer-readable program code executable by a processor to perform an operation comprising monitoring a privileged storage of a computing system, wherein at least a portion of the privileged storage stores a microcode of the computing system, determining, based on the monitoring, that a first location of the privileged storage includes an instruction, determining that the first location is designated as an unused location of the privileged storage, and performing a predefined operation to remove the instruction from the first location of the privileged storage.

BRIEF DESCRIPTION OF THE SEVERAL VIEWS OF THE DRAWINGS

FIG. 2 is a flow chart illustrating a method to eliminate and report kernel instruction alteration, according to one embodiment.

FIG. 3 is a flow chart illustrating a method to determine used and unused privileged storage locations and validate system components, according to one embodiment.

FIG. 4 is a flow chat illustrating a method to perform a predefined operation to eliminate instructions upon determining that an unused storage location includes instructions, according to one embodiment.

FIG. 5 illustrates a computing system which eliminates and reports kernel instruction alteration, according to one embodiment.

DETAILED DESCRIPTION

Figure 1:
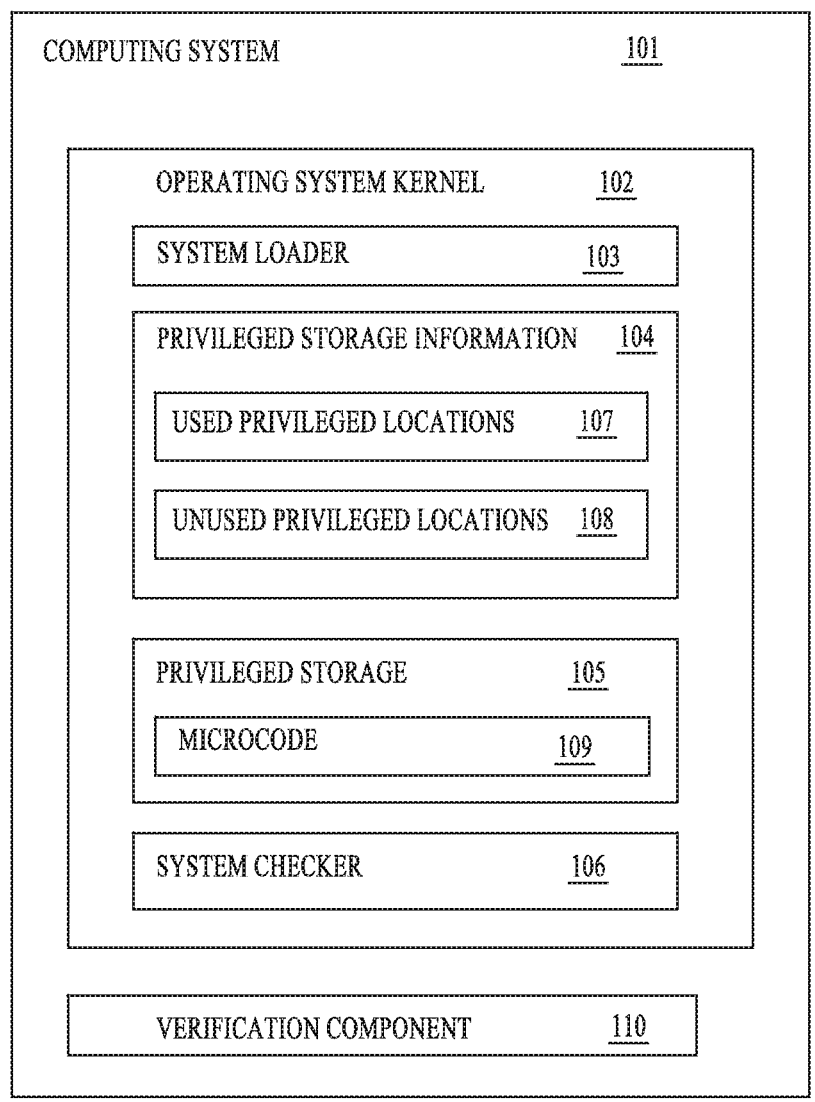
FIG. 1 illustrates a computing system which eliminates and reports kernel instruction alteration, according to one embodiment.

Embodiments disclosed herein provide techniques to eliminate and report kernel instruction alteration to improve security of computing systems. Generally, a system loader is aware of used and unused privileged (or trusted) storage locations in the system. More specifically, the system loader is aware of where all privileged code (e.g., microcode) has been loaded, and where the privileged code is located once it is executed. If the system loader (or another designated system component) determines that instructions are located in unused privileged storage locations, the system loader clears these instructions from the unused privileged storage locations. Furthermore, embodiments disclosed herein verify the integrity of system components to ensure that the loader, microcode, and stored indications of used and unused privileged storage locations have not been modified.

FIG. 1 illustrates a computing system 101 which eliminates and reports kernel instruction alteration, according to one embodiment. As shown, the computing system 101 includes an operating system (OS) kernel 102 and a verification component 110. An OS kernel 102 is a component of an OS (not pictured) that manages access to I/O devices, including access to the file system and storage, as allowing direct access to memory or other storage locations may compromise system security. As a part of managing access to memory and/or storage locations, the kernel 102 determines whether to allow the requesting application to perform file operations on the file based on the authority of the application, such as the user, group, or other authority, and the permissions on the file.

As shown, the OS kernel 102 includes a system loader 103, a data store of privileged storage information 104, one or more locations of privileged storage 105, and a system checker 106. The system loader 103 is generally configured to load the microcode 109 (and any other privileged code) into the privileged storage 105. The microcode 109 is representative of any type of trusted and/or privileged executable code loaded into the computing system 101. The microcode 109 is inclusive of the OS kernel 102, kernel space of the OS kernel 102, a trusted kernel, and/or software components of a trusted computing base of the computing system 101.

The privileged storage 105 is representative of memory, disk, and any other physical storage locations in the computing system 101 that include protected address spaces. Generally, data stored at a location in a protected address space can only be accessed by entities that have sufficient authority (or privileges). One example of privileged storage 105 is a kernel space of the OS kernel 102, which is a protected address space in memory in which core operating system operations, such as processing input/output (I/O) requests, managing memory, etc., are executed. This is in contrast to user applications that execute in user address space (which is separate from the privileged storage 105), and cannot access the privileged storage 105 directly, but instead must pass such access requests to the OS kernel 102.

Code executing in the privileged storage 105 may be considered to have full access to all memory and/or storage in the computing system 101.

The privileged storage information 104 is a data structure which stores information describing which portions of the privileged storage 105 are used and unused by the microcode 109. Generally, when the system loader 103 loads the microcode 109, the system loader builds the privileged storage information 104, to specify a plurality of used privileged locations 107 (e.g., portions of the privileged storage 105 where microcode 109 is loaded and/or executed at runtime) and a plurality of unused privileged locations 108 (e.g., portions of the privileged storage 105 where no microcode 109 is loaded and/or expected to be executed at runtime). The used privileged locations 107 may specify, without limitation, an indication of storage locations (e.g., memory addresses, disk sectors, etc.) where microcode 109 is loaded, the size of each routine in the microcode 109, the digital signature of each microcode routine, and one or more memory addresses (or other storage locations) in the privileged storage 105 where each routine in the microcode 109 will execute at runtime. The unused privileged locations 108 includes an indication of each location in the privileged storage 105 where microcode 109 has not been loaded, and/or each location in the privileged storage 105 where microcode will not execute at runtime. In at least one embodiment, the used privileged locations 107 and the unused privileged locations 108 of the privileged storage information 104 is a component of the system loader 103, and is determined based on a linker repository of the system loader 103.

The system checker 106 continuously monitors the privileged storage 105 in light of the used privileged locations 107 and the unused privileged locations 108. If the system checker 106 identifies code (e.g., any type of instruction) in the privileged storage 105 that have been designated as unused based on the unused privileged locations 108, the system checker 106 performs a predefined operation to eliminate or remove such code (e.g., writing zeroes to each of the unused privileged locations 108) in the privileged storage 105, thereby thwarting any potential malicious attacks on the computing system 101. The system checker 106 may operate as a background process on the computing system 101, and/or may be invoked interactively responsive to a request.

The verification component 110 is configured to verify the integrity of different components of the computing system 101. Generally the verification component 110 may verify the integrity based on any authentication scheme, such as trusted computing, which is used as a non-limiting example herein. In such embodiments, the verification component 110 verifies the digital signature encryption of the system loader 103, the privileged storage information 104, the system checker 106, and the microcode 109 using public/private key encryption. If the verification component 110 cannot validate the digital signatures of the system loader 103, the privileged storage information 104, the system checker 106, and/or the microcode 109, the verification component 110 may generate and output an alert that these components have been compromised. Although depicted as executing on the computing system 101, the verification component 110 may be executed on a remote system and/or loaded independently to ensure that the verification component 110 has not been altered.

FIG. 2 is a flow chart illustrating a method 200 to eliminate and report kernel instruction alteration, according to one embodiment. As shown, the method 200 begins at block 210, where computing system 101 is booted and the system loader 103 loads the microcode 109 to the privileged storage 105. In addition, the system checker 106 and the verification component 110 are executed. At block 210, the system loader 103 generates and stores indications of the used privileged locations 107 and the unused privileged locations 108 in the privileged storage information 104. Generally, the system loader 103, when loading the microcode 109, stores indications of where (e.g., one or more addresses) each routine of the microcode 109 is stored, where (e.g., one or more addresses) the routines will execute at runtime, the size of each routine, and the digital signature of the routine. All locations that do not include microcode 109 are designated as unused privileged locations 108.

At block 230, the system checker 106 monitors the privileged storage 105 to ensure that no instructions are stored in locations specified as unused privileged locations 108. At block 240, the system checker 106 determines that a location designated as an unused privileged location 108 includes one or more instructions, and performs a predefined operation to eliminate the instructions. For example, the system checker 106 may overwrite the unused privileged location 108 in the privileged storage 105 with all zeroes, all ones, or any other predefined bit pattern. At block 250, the system checker 106 optionally generates and outputs an alert specifying that the unused privileged location 108 included instructions. Doing so allows a user to investigate the system 101 to determine if malicious code is executing thereon. Similarly, if the verification component 110 encounters a digital signature of the system loader 103, the privileged storage information 104, the system checker 106, and/or the microcode 109 that does not pass the verification process, the verification component 110 may generate and output an alert specifying the component that did not pass the verification process.

FIG. 3 is a flow chart illustrating a method 300 corresponding to block 220 to determine used privileged storage locations 107 and unused privileged storage locations 108 and validate system components, according to one embodiment. As shown, the method 300 begins at block 310, where the system loader 103 determines the used privileged storage locations 107 and unused privileged storage locations 108. For example, as the system loader 103 loads microcode 109 to the privileged storage 105, the system loader 103 identifies each routine of the microcode 109, determines one or more addresses where each routine was loaded in the privileged storage 105, determines one or more addresses where each routine will execute at runtime (e.g., based on linking information), determines a size of each routine, and determines the digital signature of each routine. All locations that do not include microcode 109 (both storage and runtime) are designated as unused privileged locations 108. At block 320, the system loader 103 stores indications of the data determined at block 310 to the privileged storage information 104 as the used privileged storage locations 107 and unused privileged storage locations 108. Doing so allows the system checker 106 to monitor the privileged storage 105 and clear out any locations designated as unused privileged storage locations 108 that include instructions.

At block 330, the verification component 110 verifies that the system loader 103 has not been altered, e.g., based on the digital signature of the system loader 103. At block 340, the verification component 110 verifies that the privileged storage information 104 has not been altered, e.g., based on the digital signature of the privileged storage information 104. At block 350, the verification component 110 verifies that the system checker 106 has not been altered, e.g., based on the digital signature of the system checker 106. At block 360, the verification component 110 verifies that the microcode 109 has not been altered, e.g., based on the digital signature of each routine of the microcode 109. In some embodiments, the verification component 110 continuously executes steps 330-360 according to a predefined timing schedule to ensure that none of the components are altered while the system 101 is operational.

FIG. 4 is a flow chat illustrating a method 400 corresponding to block 240 to perform a predefined operation to eliminate instructions upon determining that an unused storage location includes instructions, according to one embodiment. As shown, the method 400 begins at block 410, where the system checker 106 determines a first location of the privileged storage 105. Generally, the system checker 106 may determine the first location in any way, such as selecting the first sequential memory (or storage) address, randomly selecting the first location, and/or based on a predefined function. At block 420, the system checker 106 determines whether the first location in the privileged storage 105 is designated as one of the unused privileged storage locations 108, e.g., by comparing the address of the first location to the addresses stored in the unused privileged storage locations 108. If the first location in the privileged storage 105 has been designated as one of the unused privileged storage locations 108, the method proceeds to block 430. Otherwise, the method proceeds to block 450. At block 430, the system checker 106 determines whether the first location in the privileged storage 105 that has been designated as one of the unused privileged storage locations 108 includes one or more instructions. If the first location in the privileged storage 105 that has been designated as one of the unused privileged storage locations 108 includes one or more instructions, the method proceeds to block 440. Otherwise, no executable code is stored at the first location, and the method proceeds to block 450.

At block 440, the system checker 106 performs a predefined operation to clear the first location in the privileged storage 105 that has been designated as one of the unused privileged storage locations 108 that includes one or more instructions. For example, the system checker 106 may overwrite the first location with all zeroes and/or all ones. Doing so clears any non-trusted code from the privileged storage 105, and preserves the integrity and security of the system 101. At block 450, the system checker 106 determines a next location of the privileged storage 105 for monitoring. For example, the system checker 106 may determine the next location sequentially, randomly, or based on some predefined function. The method 400 then returns to block 420, where the system checker 106 continues to monitor the unused privileged storage locations 108 to eliminate any code that is stored therein.

FIG. 5 illustrates a system 500 which eliminates and reports kernel instruction alteration, according to one embodiment. The networked system 500 includes the computing system 101. The computing system 101 may also be connected to other computers via a network 530. In general, the network 530 may be a telecommunications network and/or a wide area network (WAN). In a particular embodiment, the network 530 is the Internet.

The computing system 101 generally includes a processor 504 which obtains instructions and data via a bus 520 from a memory 506 and/or a storage 508. The computing system 101 may also include one or more network interface devices 518, input devices 522, and output devices 524 connected to the bus 520. The computing system 101 is generally under the control of an operating system 521. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system 521 supporting the functions disclosed herein may be used. The processor 504 is a programmable logic device that performs instruction, logic, and mathematical processing, and may be representative of one or more CPUs. The network interface device 518 may be any type of network communications device allowing the computing system 101 to communicate with other computers via the network 530.

The storage 508 is representative of hard-disk drives, solid state drives, flash memory devices, optical media and the like. Generally, the storage 508 stores application programs and data for use by the computing system 101. In addition, the memory 506 and the storage 508 may be considered to include memory physically located elsewhere; for example, on another computer coupled to the computing system 101 via the bus 520.

The input device 522 may be any device for providing input to the computing system 101. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computing system 101. The output device 524 may include output devices such as monitors, touch screen displays, and so on.

As shown, the memory 506 contains the OS kernel 102, the system loader 103, the privileged storage information 104, the system checker 106, and the verification component 110, each described in greater detail above. The privileged storage 105 of the system 101 may include locations in the memory 506 and/or the storage 508. Generally, the system 500 is configured to implement all systems, methods, and functionality described above with reference to FIGS. 1-4.

Advantageously, embodiments disclosed herein provide techniques to block users from injecting harmful code into protected or privileged storage areas of a computing system, even if these users have the requisite permissions to access privileged storage areas. By tracking used and unused privileged storage locations, embodiments disclosed herein may identify code stored in locations that are designated as unused, and remove the code to preserve system security and integrity. Furthermore, by ensuring that the digital signatures of different system components are valid, embodiments disclosed herein provide extra security to the system. Doing so prevents users from modifying the system components that orchestrate the cleaning of unused areas of the privileged storage that include unknown instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
determining a first location of a privileged storage where microcode is currently stored;
determining a second location of the privileged location that the microcode will execute using the second location at runtime;
designating at least a first portion of the privileged storage of a computing system as unused, based on determining that (i) the first portion does not include microcode of the computing system and (ii) that the first portion will not be used to execute microcode at runtime;
designating a second portion of the privileged storage as used, wherein the second portion includes the second location, based on determining that the microcode will execute using the second portion of the privileged storage at runtime;
storing an indication of the first and second portions in a data structure describing use of the privileged storage, wherein the data structure specifies at least one unused portion of the privileged storage and at least one used portion of the privileged storage;
monitoring, during runtime, the privileged storage, wherein at least a portion of the privileged storage stores a microcode of the computing system;
determining, based on the monitoring, that a first location of the privileged storage includes an instruction;
determining, by referencing the data structure, that the first location is designated as an unused location of the privileged storage; and
performing a predefined operation to remove the instruction from the first location of the privileged storage.

2. The method of claim 1, further comprising:
loading, by a loader of the computing system, the microcode to the privileged storage;
storing, in a data store of privileged storage information, an indication of: (i) each routine of the microcode, (ii) a respective location in the privileged storage where each routine was loaded, (iii) a respective runtime location where each routine will execute, (iv) a size of each routine, and (v) a digital signature of each routine; and storing, in the data store of privileged storage information, an indication of each unused location of the privileged storage.

3. The method of claim 2, wherein determining that the first location is designated as the unused location of the privileged storage comprises comparing the first location to the locations stored in the data store of privileged storage information.

4. The method of claim 1, further comprising:
generating an alert reflecting that the first location included the instruction; and
outputting the alert for display.

5. The method of claim 1, wherein a system checker performs the predefined operation, the method further comprising:
verifying, by a verification component, a respective digital signature of: (i) the system checker, (ii) a system loader, (iii) the microcode, and (iv) the privileged storage information.

6. The method of claim 5, further comprising:
determining, by the verification component, that verification of at least one of the digital signatures failed;
generating, by the verification component, an indication that the verification of at least one of the digital signatures failed; and
outputting the generated indication for display.

7. The method of claim 1, wherein the privileged storage of the computing system comprises a memory and a disk, wherein the predefined operation comprises overwriting the instruction at the first location with one of: (i) all zeros, and (ii) all ones.

8. A computer program product, comprising:
a non-transitory computer-readable storage medium having computer readable program code embodied therewith, the computer readable program code executable by a processor to perform an operation comprising:
determining a first location of a privileged storage where microcode is currently stored;
determining a second location of the privileged location that the microcode will execute using the second location at runtime;
designating at least a first portion of the privileged storage of a computing system as unused, based on determining that (i) the first portion does not include microcode of the computing system and (ii) that the first portion will not be used to execute microcode at runtime;
designating a second portion of the privileged storage as used, wherein the second portion includes the second location, based on determining that microcode will execute using the second portion of the privileged storage at runtime;
storing an indication of the first and second portions in a data structure describing use of the privileged storage, wherein the data structure specifies at least one unused portion of the privileged storage and at least one used portion of the privileged storage;
monitoring, during runtime, the privileged storage, wherein at least a portion of the privileged storage stores a microcode of the computing system;
determining, based on the monitoring, that a first location of the privileged storage includes an instruction;
determining, by referencing the data structure, that the first location is designated as an unused location of the privileged storage; and performing a predefined removal operation to remove the instruction from the first location of the privileged storage.

9. The computer program product of claim 8, the operation further comprising:
loading, by a loader of the computing system, the microcode to the privileged storage;
storing, in a data store of privileged storage information, an indication of: (i) each routine of the microcode, (ii) a respective location in the privileged storage where each routine was loaded, (iii) a respective runtime location where each routine will execute, (iv) a size of each routine, and (v) a digital signature of each routine; and
storing, in the data store of privileged storage information, an indication of each unused location of the privileged storage.

10. The computer program product of claim 9, wherein determining that the first location is designated as the unused location of the privileged storage comprises comparing the first location to the locations stored in the data store of privileged storage information.

11. The computer program product of claim 8, the operation further comprising:
generating an alert reflecting that the first location included the instruction; and
outputting the alert for display.

12. The computer program product of claim 8, wherein a system checker performs the removal operation, the operation further comprising:
verifying, by a verification component, a respective digital signature of: (i) the system checker, (ii) a system loader, (iii) the microcode, and (iv) the privileged storage information.

13. The computer program product of claim 12, the operation further comprising:
determining, by the verification component, that verification of at least one of the digital signatures failed;
generating, by the verification component, an indication that the verification of at least one of the digital signatures failed; and
outputting the generated indication for display.

14. The computer program product of claim 8, wherein the predefined operation comprises overwriting the instruction at the first location with one of: (i) all zeros, and (ii) all ones.

15. A system, comprising:
a processor; and
a memory storing one or more instructions which, when executed by the processor, performs an operation comprising:
determining a first location of a privileged storage where microcode is currently stored;
determining a second location of the privileged location that the microcode will execute using the second location at runtime;
designating at least a first portion of the privileged storage of a computing system as unused, based on determining that (i) the first portion does not include microcode of the computing system and (ii) that the first portion will not be used to execute microcode at runtime;
designating a second portion of the privileged storage as used, wherein the second portion includes the second location, based on determining that microcode will execute using the second portion of the privileged storage at runtime;
storing an indication of the first and second portions in a data structure describing use of the privileged storage, wherein the data structure specifies at least one unused portion of the privileged storage and at least one used portion of the privileged storage;
monitoring, during runtime, the privileged storage, wherein at least a portion of the privileged storage stores a microcode of the computing system;
determining, based on the monitoring, that a first location of the privileged storage includes an instruction;
determining, by referencing the data structure, that the first location is designated as an unused location of the privileged storage; and
performing a predefined removal operation to remove the instruction from the first location of the privileged storage.

16. The system of claim 15, the operation further comprising:
loading, by a loader of the computing system, the microcode to the privileged storage;
storing, in a data store of privileged storage information, an indication of: (i) each routine of the microcode, (ii) a respective location in the privileged storage where each routine was loaded, (iii) a respective runtime location where each routine will execute, (iv) a size of each routine, and (v) a digital signature of each routine; and
storing, in the data store of privileged storage information, an indication of each unused location of the privileged storage.

17. The system of claim 16, wherein determining that the first location is designated as the unused location of the privileged storage comprises comparing the first location to the locations stored in the data store of privileged storage information.

18. The system of claim 15, the operation further comprising:
generating an alert reflecting that the first location included the instruction; and
outputting the alert for display.

19. The system of claim 15, wherein a system checker performs the removal operation, the operation further comprising:
verifying, by a verification component, a respective digital signature of: (i) the system checker, (ii) a system loader, (iii) the microcode, and (iv) the privileged storage information.

20. The system of claim 19, wherein the privileged storage of the computing system comprises a memory and a disk, wherein the predefined operation comprises overwriting the instruction at the first location with one of: (i) all zeros, and (ii) all ones, and wherein the operation further comprises:
determining, by the verification component, that verification of at least one of the digital signatures failed;
generating, by the verification component, an indication that the verification of at least one of the digital signatures failed; and
outputting the generated indication for display.

\* \* \* \* \*